United States Patent [19]
Ferguson

[11] Patent Number: 5,889,466
[45] Date of Patent: *Mar. 30, 1999

[54] APPARATUS AND METHOD OF PROVIDING POWER CONTROL BASED ON ENVIRONMENTAL CONDITIONS

[75] Inventor: Bruce R. Ferguson, Anaheim, Calif.

[73] Assignees: Sony Corporation, Tokyo, Japan; Sony Trans Com, Inc., Irvine, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 783,604

[22] Filed: Jan. 14, 1997

[51] Int. Cl.⁶ .................................................. G08B 21/00
[52] U.S. Cl. .......................... 340/602; 340/584; 307/112; 307/117; 307/118
[58] Field of Search ..................................... 340/602, 584; 307/29, 116, 112, 115, 117, 118

[56] References Cited

U.S. PATENT DOCUMENTS

| | | | |
|---|---|---|---|
| 4,236,084 | 11/1980 | Gingras | 307/117 |
| 4,659,909 | 4/1987 | Knutson | 219/452 |
| 5,574,497 | 11/1996 | Henderson et al. | 348/144 |

Primary Examiner—Jeffrey A. Hofsass
Assistant Examiner—Julie B. Lieu
Attorney, Agent, or Firm—Blakely, Sokoloff, Taylor and Zafman LLP

[57] ABSTRACT

The present invention is a method and apparatus for controlling power supply to aircraft electronic systems based on ambient environmental conditions. The apparatus comprises a monitor for detecting an environmental condition, a power supply for providing power, a circuit which receives power from the power supply, and a switch coupled to the monitor. Upon detection of the environmental condition, the switch connects the power supply to the circuit, otherwise the switch disconnects the circuit from the power supply.

28 Claims, 5 Drawing Sheets

APPARATUS AND METHOD OF PROVIDING POWER CONTROL BASED ON ENVIRONMENTAL CONDITIONS

BACKGROUND OF THE INVENTION

1. Field of the Invention

The present invention relates to power control, and more particularly, to a method and apparatus of providing power control to an integrated electronic system, based on ambient environmental conditions.

2. Description of the Related Art

Over the past few decades, commercial aircraft has become a necessary mode of travel for personal and business reasons. To improve passenger comfort, commercial aircraft typically offer a number of entertainment activities that can be enjoyed by the passenger, such as video games, movies and various selections of music. In addition, various electronic systems for supporting communications and/or other in-flight functions are provided.

Despite temperature and humidity control, the electronic compartments of commercial aircraft can reach temperature and humidity extremes that exceed the specified operating conditions for certain electrical or mechanical components in these electronic systems. These environmental extremes will subject the electronic or mechanical components to unnecessary stress. They may also cause the components to malfunction if devices utilizing the components are powered up under these extreme conditions.

A number of solutions in handling environmental extremes are impractical for implementation in in-flight entertainment systems. For example, the implementation of additional fans or other cooling systems will result in a corresponding increase in weight and cost. Moreover, it is difficult to control the environmental conditions the aircraft is subject to, so that maintenance of an ideal range of environmental conditions may be difficult. In addition, maintenance of the cooling systems may only be available at a number of specific locations, making this task expensive and commercially unattractive.

To insure the reliability of these sensitive components, it is necessary to prevent the components from operating when the ambient conditions within the aircraft or portions of the aircraft exceed the specified operating conditions for these components. However, while control and vital electronics such as that in navigation systems require protection from environmental extremes using solutions such as multiple redundancy, cooling and shielding, those implemented in nonvital electronics such as in-flight entertainment systems do not require such expensive solutions which may also require high maintenance.

Accordingly, there is a need in the technology for an apparatus and method for providing power control to electronic systems, in particular, sensitive electronic systems located in an in-flight entertainment system, so that these sensitive electronic systems will only be operable within acceptable environmental conditions, thereby increasing the reliability of the electronic systems. The apparatus and method must be highly reliable but inexpensive and must also require minimal maintenance.

BRIEF SUMMARY OF THE INVENTION

The present invention is a method and apparatus for controlling power supply to aircraft electronic systems based on ambient environmental conditions. The apparatus comprises a monitor for detecting an environmental condition, a power supply for providing power, a circuit which receives power from the power supply, and a switch coupled to the monitor. Upon detection of the environmental condition, the switch connects the power supply to the circuit, otherwise the switch disconnects the circuit from the power supply.

DETAILED DESCRIPTION OF THE INVENTION

Figures 1, 1A:
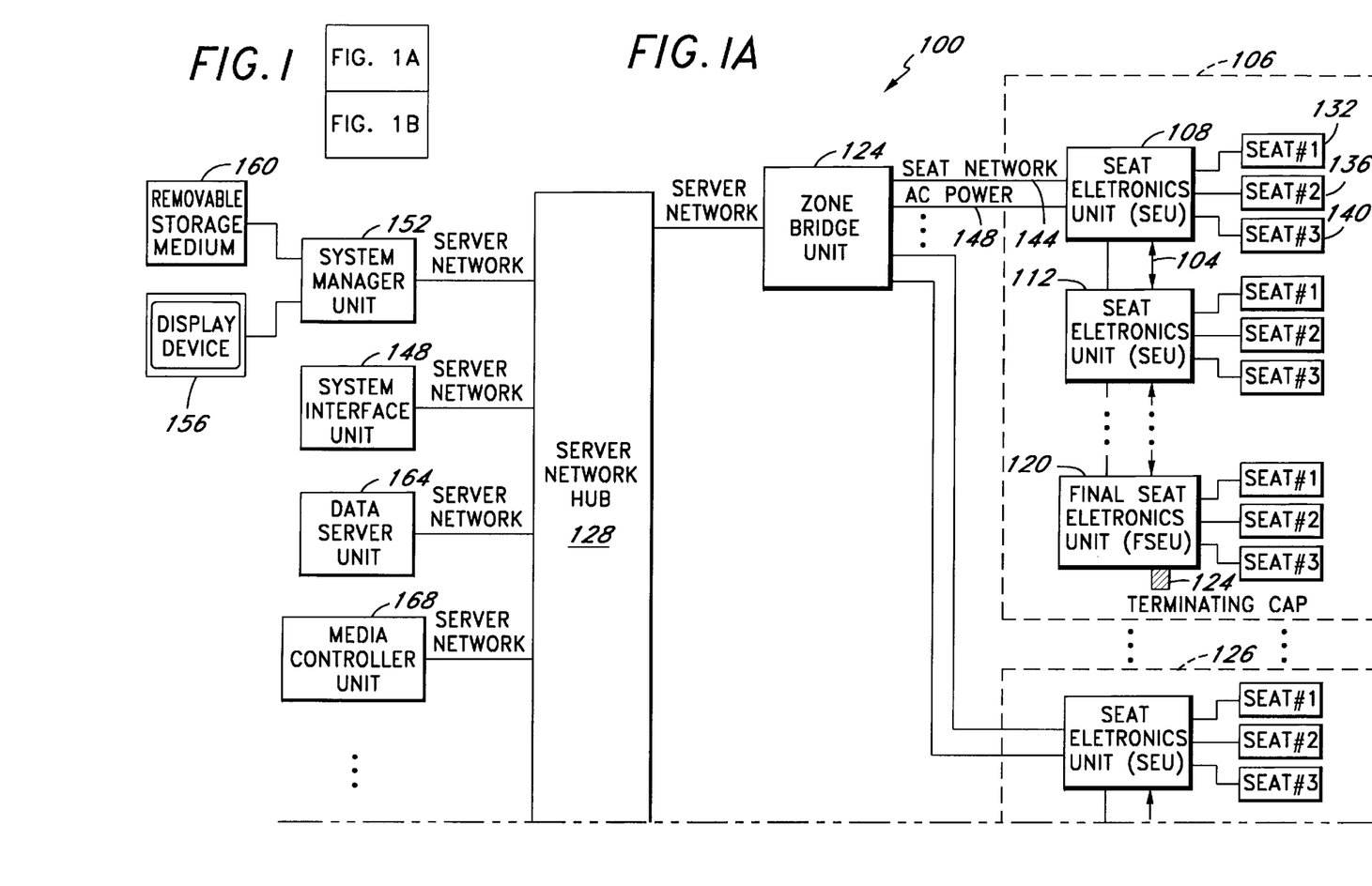
FIGS. 1A and 1B illustrate an exemplary in-flight entertainment system which implements the power control system of the present invention.
Figure 1B:
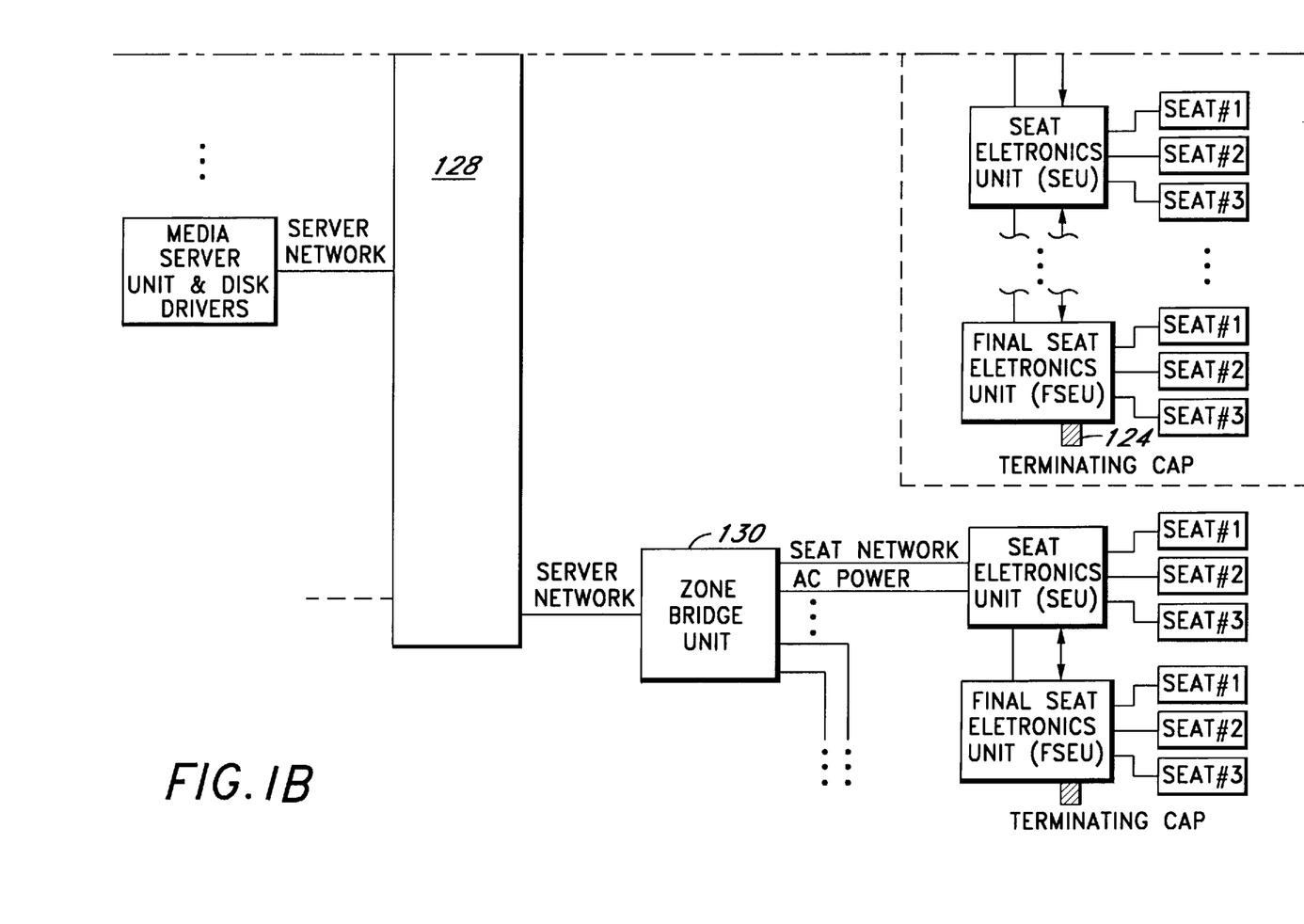

FIGS. 1A and 1B together show an overall schematic view of an examplary in-flight entertainment system 100 for airborne applications. The flight entertainment system 100 comprises bus termination electronics which includes an interconnect bus 104, a daisy chain 106 of interconnecting seat electronic units (SEUs) 108, 112, 120 and a terminating cap 124. Each daisy chain 106 is connected such that the output of one SEU is connected to the input of the next SEU until the final seat electronics unit (FSEU) 120 is reached. The SEUs receive the audio and video signals from a Zone Bridge Unit (ZBU) 124. Each ZBU 124 supports multiple daisy chains 106, 126. A Server Network Hub 128 coordinates and communicates the information to and from multiple ZBUs 124, 130 to supporting electronics.

Each SEU, e.g. SEU 108, provides the necessary audio and video signals to support a number of passenger seats 132, 136, 140 in the passenger compartment of an aircraft. In one embodiment, an SEU may support two to three passenger seats depending on the aircraft configuration used. In the described embodiment, up to 12 SEUs are daisy chained together although the number of SEUs in a daisy chain may vary.

Each ZBU 124 services one section or zone of an aircraft. A ZBU 124 may service multiple daisy chains 106, 126. In one design, daisy chain 106, 126 may serve an aisle of a plane while each ZBU 124 serves a plane section. The bus which forms each daisy chain 106, is terminated at the FSEU 120. The FSEU includes terminating cap 124 which terminates interconnect bus 104.

ZBU 124 distributes audio and video data on a seat network bus 144 and power along power line 148 to the various SEUs 108, 112. The system may also receive data, such as credit card information, entertainment requests, or merchandise orders, from seat electronics (not shown) in the vicinity of passenger seat 132, 136, 140. The respective SEU unit 108 receives the data and may then transfer the data to the respective ZBU 124 via seat network bus 144. This information may be further transmitted through the server network hub 128 to other electronics aboard the aircraft, or in the case of telephone or other communication to a public switched telephone network ("PSTN") or other external networks outside of the aircraft through a system interface unit 148. A system manager unit (SMU) 152 oversees operation of the IFE. The SMU 152 is coupled to a display device 156 which displays passenger requests and system status information. A floppy drive 160 is also provided for storing data.

The IFE, including the SMU 152 and the SEUs 108, 112, 120 is designed to perform self diagnostic checks. In particular, the SEUs perform diagnostic checks and may forward error messages to the SMU. For example, if terminating cap 124 is not properly installed, a microcontroller or other supporting electronics in the FSEU 120 will cause an error message to be transmitted through interconnect bus 104, seat network bus 144, and via server network hub 128 to SMU 152. The SMU 152 then displays the error on display device 156 or the information is stored on a floppy disk or other removable storage medium 160 for further use or analysis. This information enables technicians or maintenance personnel to quickly troubleshoot the IFE system.

Server network hub 128 may further be coupled to other units which provide information such as Data Server Units (DSUs) 164 and Media Controller Units (MCUs) 168 which provide the video/audio contact.

Figure 2:
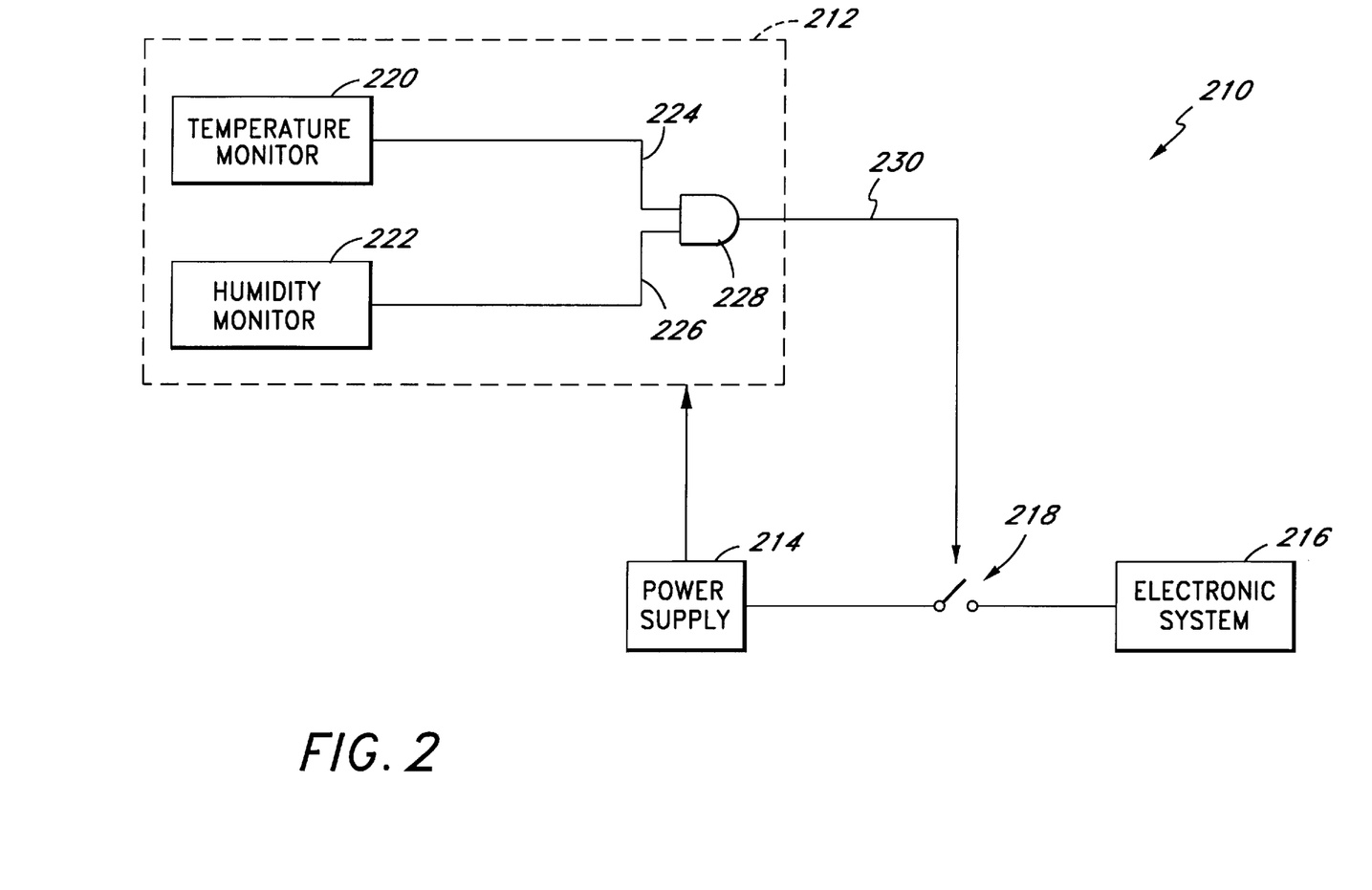
FIG. 2 is a block diagram of one embodiment of the power control system in accordance with the teachings of the present invention.

FIG. 2 is a block diagram of one embodiment of the power control system in accordance with the teachings of the present invention. In a preferred embodiment, the power control system 210 is used in supplying current to electronic systems which provide in-flight entertainment services such as those shown in FIGS. 1A and 1B. These electronic systems include, but are not limited to, SEUs 108, 112, 120, System Manager Unit 152, System Interface Unit 148, Data Server Unit 164, and Media Controller Unit 168. The power control system 210 comprises an environmental monitoring circuit 212 that is powered by a power supply 214. The power supply 214 is also coupled to an electronic system 216, such as a disk drive, a media server or a data server, via a power control switch 218. The power control switch 218 may include a plurality of switches, each of which is coupled to a separate electronic system. Supply current and voltage from the power supply 214 are provided to the electronic system 216 only when the environmental monitoring circuit 212 indicates that the monitored environmental conditions are within acceptable limits. When this occurs, the power control switch 218 is closed, so that supply current and voltage from the power supply are provided to the electronic system 216.

In one embodiment, the environmental monitoring circuit 212 comprises a temperature monitor 220 and a humidity monitor 222, each of which provides an output via signal lines 224 and 226 respectively, to an AND gate 228 using any known protocol. When the temperature monitor 220 detects that the ambient temperature is within an acceptable temperature range, it generates a high logic level via signal line 224. Similarly, when the humidity monitor 222 detects that the ambient temperature is within an acceptable humidity range, it generates a high logic level via signal line 226. The output signals provided via signal lines 224 and 226 are received by the AND gate 228, which only sends a high logic level via signal line 230, if both the ambient temperature and humidity are within their respective allowable limits. This high logic level will result in the closure of the power control switch 218, so that supply current from the power supply 214 will be provided to the electronic system 216. If either the temperature or humidity levels fall outside the allowable operating range, the power switch 218 will be opened, removing power from the electronic system 216.

In the in-flight entertainment system, the electronic system 16 may be used to store movies which may be provided on demand. One typical example of the electronic system 216 includes a disk drive. To maintain the reliability and operating life of the disk drive, use of the disk drive is limited to a temperature range of greater than 5 degrees Celsius and less than 50 degrees Celsius. In addition, use of the disk drive is also limited to humidity of less than 95%. It is understood that the temperature and humidity ranges may be adjusted on a case-by-case basis according to the sensitivity and operating tolerances of the electronics system. The use of only the temperature monitor 220 or the humidity monitor 222 is contemplated and may be implemented. Use of other sensors, such as pressure, motion, smoke and fire sensors, is also contemplated and may be implemented according to need.

Figure 3:
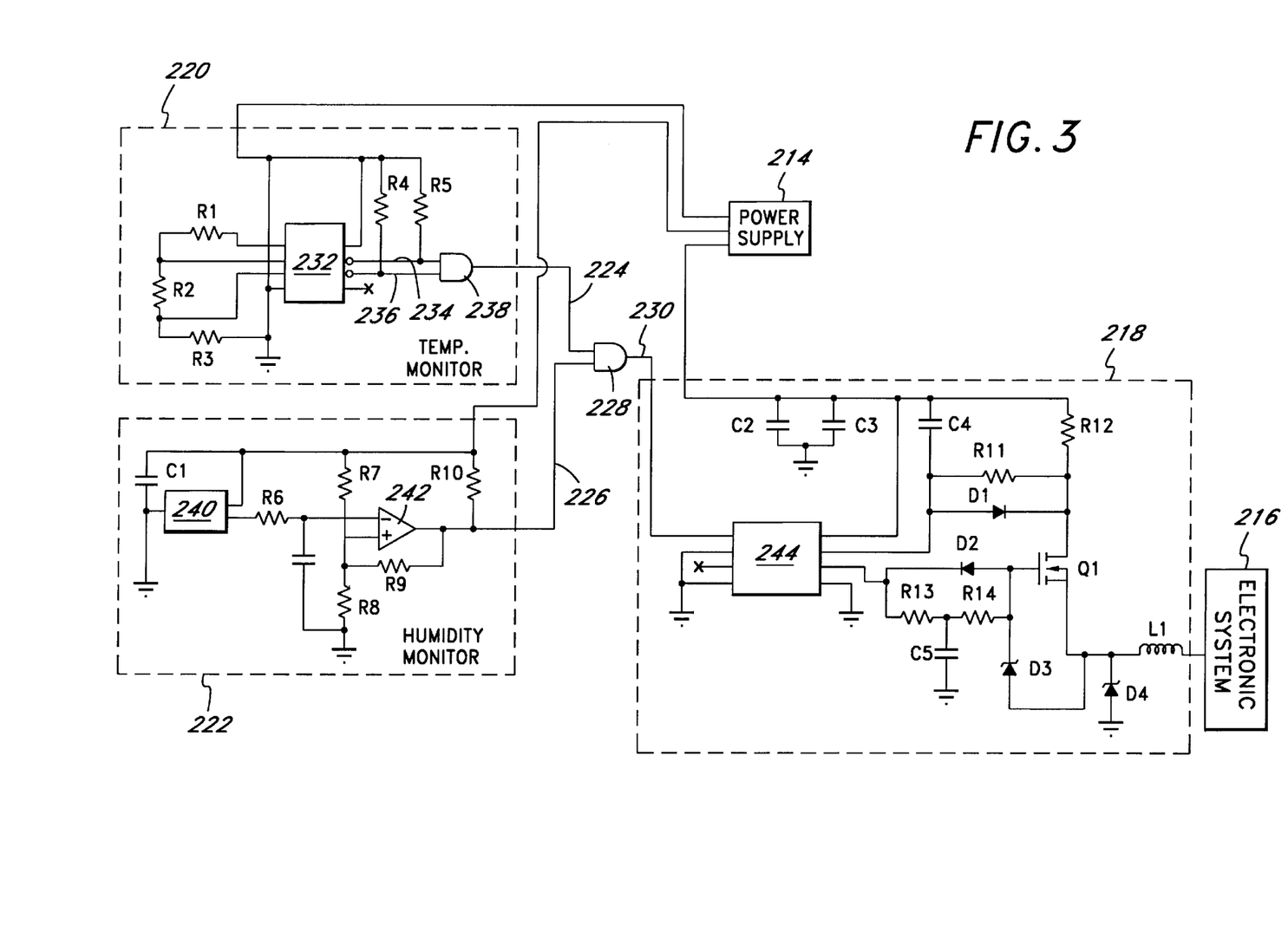
FIG. 3 is a detailed schematic diagram of the power control system of FIG. 2.

FIG. 3 is a detailed schematic diagram of the power control system of FIG. 2. As shown, the temperature monitor 220 comprises a temperature sensor 232, such as that manufactured by Analog Devices under the part designation TMP01. The temperature sensor 232 is used to determine whether the ambient temperature is within an upper and a lower limit as determined by the values of user-selected resistors R1, R2 and R3. For example, with resistance values of 28.7 Kohmss, 5.49 Kohmss and 44.2 Kohmss for R1, R2 and R3 respectively, the upper temperature limit is configured to be 45 degrees Celsius, while the lower temperature limit is 10 degrees Celsius. In addition, the hysteresis (overshoot or tolerance) band is configured to be 5 degrees Celsius.

In particular, when the detected temperature is determined to be within the high and low temperature trip points (i.e., when temperature conditions are favorable), output signals are generated via signal lines 234 and 236 respectively, indicating that the ambient temperature conditions are favorable. These output signals are provided to AND gate 238 which generates an output signal via signal line 226 accordingly. If the detected temperature is either above the allowable high temperature trip point, or below the allowable low temperature trip point, the corresponding output signal provided via signal line 234 or 236 respectively will be pulled low, indicating that there is a temperature fault. As a result, the AND gate 238 will not generate a high logic level.

A 5 degree Celsius hysteresis band serves to maintain the temperature monitor 220 in a "fault-indicating" state once a temperature threshold has been exceeded. Of course, other band tolerances can be implemented. This "fault-indicating" state is maintained until the temperature reverses direction (either upwardly or downwardly as the case may be) by at least 5 degrees Celsius. This feature prevents the output of the temperature monitor 220, as provided via signal line 226, from toggling between high and low logic states when the temperature is merely varying slightly around one of the threshold levels.

The humidity monitor 222 comprises a humidity sensor 240, such as that manufactured by Quality Semiconductor under the part designation IH36058. The humidity sensor 240 produces an output voltage that is a function of the supply voltage, as multiplied by the relative humidity. For example, the humidity sensor 240 can generate a linear output voltage of 0.8 to 3.9 Vdc over the full range of 0–100% relative humidity when excited by a 5 Vdc reference. The output voltage is provided to the noninverting terminal of a comparator 242, which compares the output voltage to a predetermined threshold set by voltage divider R7 and R8, and hysteresis resistor R9. The hysteresis resistor R9 prevents the humidity monitor 222 from toggling on and off due to erratic noise as discussed above, when the humidity is varying around the threshold.

The resistors R7, R8 and R9 set the threshold to a predetermined percentage of the supply voltage. This predetermined percentage of the supply voltage is proportional to a predetermined humidity level, for example, 98% in the case of a disk drive. If the humidity level is less than 92%, the comparator generates a high logic level via signal line 224. Otherwise, a low logic level is generated. In particular, with resistance values of 2 Kohms, 20 Kohms and 63.4 Kohms for R6, R7 and R8 respectively, the comparator 242 will generate a logic low signal when the relative humidity rises above 98%. When the relative humidity drops below 92%, the comparator 242 will generate a logic high signal via signal line 224. A low pass filter comprises resistor R6 and capacitor C53 is used to attenuate noise present at the humidity sensor 240 output pin (pin 2) before the threshold comparison is made by comparator 242.

Thus, the signal generated by the temperature monitor 220 via signal line 224 will be a logic high signal when the ambient temperature is within the safe operating region. Likewise, the signal generated by the humidity monitor 222 via signal line 226 will also be a logic high signal when the ambient relative humidity is within the safe operating region. The signals provided via signal lines 224 and 226 are provided to an AND gate 228, which generates a logic high logic level as long as both temperature and relative humidity conditions are favorable.

The output of the AND gate 228 may be provided to a programmable timer (not shown) or a clock (not shown) which is implemented to delay the shutdown of the electronic system 216 by a predetermined amount of time (for instance, one minute) after the temperature or humidity thresholds are exceeded. A microprocessor (not shown) may also be coupled to the temperature monitor 220 and the humidity monitor 222 to monitor the changes in environmental condition. If thus implemented, the microprocessor may use the time delay generated by the programmable timer to store vital information to the electronic system 216 before the electronic system 216 becomes inoperative. The programmable timer may be placed between the AND gate 228 and the switch 218.

Alternatively, the AND gate 228 may be coupled directly to the switch 218. As discussed earlier, more than one power control switch 218 may be used to couple an electronics system 216 to the power supply 214. For present discussion purposes, only one power control switch 218 and one electronics system 216 will be discussed. The power control switch 218 comprises a power driver 244 such as that manufactured by Linear Technology under the part designation LTC1154 and a MOSFET transistor Q1. The power driver 244 performs two primary functions. The first is to level shift the logic input to a voltage level output appropriate to drive the gate of transistor Q1. The second is to provide short circuit protection to Q1 by sensing the current flow through Q1 by monitoring the voltage across resistor R12. If the voltage across resistor R12 exceeds a predetermined threshold (for instance, 100 mV), the power driver 244 instantly latches the gate voltage at Q1 to a low potential, thereby shutting Q1 off and preventing Q1 from failing due to an overpower condition.

The input pin IN of the driver 244 is active high and receives input signals from the AND gate 228. The shutdown pin SD immediately disables the switch 218 if a secondary fault condition is detected. In the present situation, SD is tied to ground and thus not used. The ENABLE pin provides a secondary means of control, but in the present case, is also grounded and thus not used. The supply pin VS of the power driver 244 powers the input, gate drive pin GATE, regulation and protection circuitry of the driver 244. It also provides an internal reference for the drain sense resistor R12. The driver 244 senses the current flowing into the drain of the Q1. An internal 100 mV reference is compared to the drop across the sense resistor R12 in series with the drain lead. If the drop across this resistor R12 exceeds the internal 100 mV threshold, the input latch is reset an the gate is quickly discharged.

Then the driver 244 receives a logic high signal from AND gate 228, indicating that the temperature and humidity conditions are favorable, it turns transistor Q1 on, thereby connecting the power supply 214 to the electronic system 216. When a logic low signal is received, indicating that both temperature and humidity conditions are unfavorable, the driver 244 turns transistor Q1 off, so that the power supply 214 will be disconnected from the electronic system 216.

Various other components in the power control switch 218 are used for filtering and signal conditioning purposes. Capacitors C2 and C3 are coupled in parallel and serve to filter the power into the switch 218 to minimize the sensitivity of the switch 18 to other circuits connected to the common +5 Vdc power supply. Resistor R11 and capacitor C4 form a low pass filter on the current sense input to the driver 244. The presence of this low pass filter slows the reaction time of the driver 244 and reduces the sensitivity of the switch 218 to very short duration current spikes that may be produced by the electronic system 216, that are not a threat to Q1 but might otherwise cause the switch 218 to shut down. A diode D1 is placed across the resistor R11 and serves to bypass the filter formed by resistor R11 and capacitor C4, in the event of a catastrophic short circuit. The diode D1 allows the driver 244 to respond instantly if the current through resistor R12 exceeds a predetermined value. A zener diode D3 is coupled to transistor Q1 to prevent the gate-to-source voltage of transistor Q1 from exceeding a predetermined voltage, above which transistor Q1 could be damaged.

Resistors R13 and R14, and capacitor C5 together form a low pass filter which slows down the turn-on time of transistor Q1. This permits the switch 18 to drive a highly capacitive load. In addition, this filter enables the voltage at the gate of transistor Q1 to rise very slowly. Since the transistor Q1 is arranged in a source-follower configuration, the voltage at the source of transistor Q1, which is also the output voltage of the switch 218, also rises very slowly. Consequently, the slow rise of the switch 218 output voltage enables the switch 218 to charge a capacitive load using very little current. In this manner, the overcurrent threshold of the switch 218 will not be exceeded and the switch 218 will not be erroneously shut down. A diode CR11 is placed across the filter comprising R13, 156 and C5 to facilitate by-passing of this filter when current to the gate of transistor Q1 is turned off, thus enabling the switch 218 to turn off much faster than it is turned on. An inductor L1 coupled to the source of transistor Q1 provides suppression of high frequency electromagnetic interference that might otherwise be coupled from the electronic system 16 to the +5 Vdc power supply. A zener diode D4, is coupled in parallel to inductor L1, and provides protection against the voltage kick-back that occurs when the current through the inductance of the electronic system 216 power line and the value of inductor L1 are abruptly shut off. The diode D4, also clamps the high voltage transients that may be induced onto the cable to the electronic system 216 from external sources.

Figure 4:
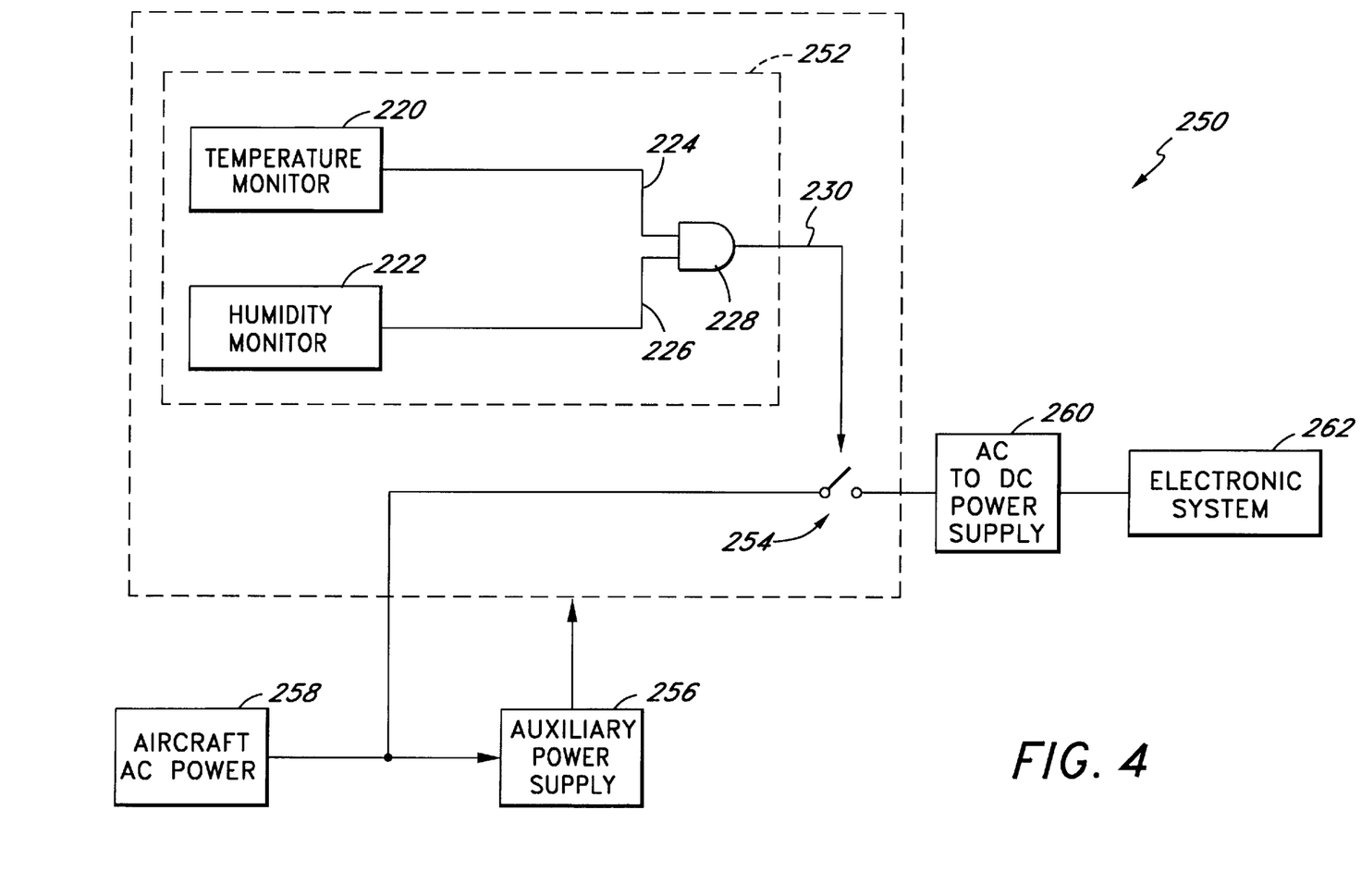
FIG. 4 is a block diagram of a second embodiment of the power control system of the present invention.

FIG. 4 is a block diagram of a second embodiment of the power control system of the present invention. The power control system 250 comprises an environmental monitoring circuit 252, which is identical to the environmental monitoring circuit 212 of FIG. 2. The power control system 250 also comprises a power control switch 254 that is identical to the power control switch 218. The environmental monitoring circuit 252 and the power control switch 218 are both powered by an auxiliary low voltage power supply 256. The auxiliary power supply 256 in turn receives power from a central alternating current (AC) power supply, such as Aircraft AC power supply 258 and converts the alternating current to direct current (connection not shown). The switch 254, when closed, provides power from the Aircraft AC power supply 258 to the AC to DC power supply 260. The AC to DC power supply 260 in turn supplies power to the electronic system 262.

In operation, when either the temperature or humidity within the aircraft (or the zone or portion of the aircraft being sensed) is outside allowable limits, the switch 254 is de-energized and thus opened. Alternatively, when either the temperature or humidity within the aircraft or a portion thereof is within predetermined limits, the switch 254 is de-energized and thus opened. This in turn cuts off the AC power from Aircraft AC power supply 58 to the AC to DC power supply 260. As a result, the power supply to the electronics system 262 is terminated, while the environmental monitoring circuit 252 and the power control switch 254 remain powered by the auxiliary power supply 256. When environmental conditions return to an acceptable level, the electronics system 262 may again be powered up.

Through the implementation of the principles of the present invention, the reliability and operational life of environmentally-sensitive electronics systems such as disk drives may be insured and extended. Conversely, by limiting the environmental conditions under which an electronics system has to operate, the cost of providing an electronics system in an in-flight entertainment system may be reduced by utilizing more consumer-oriented and thus more sensitive, lower cost components, whose operating life and reliability can be protected through the use of the present invention. The use of ruggedized and costly components can therefore be reduced.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed:

1. A power control apparatus for an in-flight entertainment system, comprising:
    power supply means for providing power;
    monitor means for detecting an on-board environmental condition, said monitor means receiving power independently of the environmental condition deteted by said monitor;
    a power circuit for receiving power from the power supply and for coupling power to an electronic system; and
    switch means coupled to the monitor means, said switch means for connecting the power supply means to the power circuit for providing power to the in-flight entertainment system upon detection of the environmental condition and otherwise completely disconnecting the power circuit from the power supply means without interrupting power to the monitor.

2. The apparatus as recited in claim 1, wherein the monitor means comprises a temperature sensor and the environmental condition is a predetermined temperature range.

3. The apparatus as recited in claim 1, wherein the monitor means comprises a humidity sensor and the environmental condition is a predetermined humidity range.

4. The apparatus as recited in claim 1, wherein the monitor means comprises a temperature sensor, a humidity sensor and an AND gate that is coupled to the temperature sensor and the humidity sensor and wherein the environmental condition is the presence of a predetermined temperature range and a predetermined humidity range.

5. The apparatus as recited in claim 1, wherein the environmental condition is within a predetermined range.

6. The apparatus as recited in claim 1, wherein the environmental condition is outside a predetermined range.

7. A power control apparatus for an in-flight entertainment system, comprising:
    a first power supply;
    a second power supply;
    a monitor coupled to the second power supply for detecting an on-board environmental condition, said monitor receiving power from the second power supply independently of the environmental condition detected by said monitor;
    a circuit configured to receive power from the first power supply; and
    a switch coupled to the monitor, said switch for connecting the first power supply to the circuit upon detection of the environmental condition and for otherwise completely disconnecting the circuit from the first power supply without interrupting power to the monitor, wherein the in-flight entertainment system or components thereof is selectively energized or deenergized in response to the on-board environmental condition.

8. The apparatus as recited in claim 7, wherein the monitor comprises a temperature sensor and the environmental condition is a predetermined temperature range.

9. The apparatus as recited in claim 7, wherein the monitor comprises a humidity sensor and the environmental condition is a predetermined humidity range.

10. The apparatus as recited in claim 7, wherein the environmental condition is within a predetermined range.

11. The apparatus as recited in claim 7, wherein the environmental condition is outside a predetermined range.

12. The apparatus as recited in claim 7, wherein the monitor comprises a temperature sensor, a humidity sensor and an AND gate that is coupled to the temperature sensor and the humidity sensor and wherein the environmental condition is the presence of a predetermined temperature range and a predetermined humidity range.

13. A power control apparatus for an in-flight entertainment system, comprising:
    a power supply for providing power;
    a monitor for detecting an on-board environmental condition, the monitor receiving power independently of the environmental condition detected by said monitor;
    a power circuit which receives power from the power supply and couples it to the in-flight entertainment system to provide power thereto; and
    a switch coupled to the monitor, said switch for connecting the power supply to the power circuit upon detection of the environmental condition and otherwise completely disconnecting the power circuit from the power supply without interrupting power to the monitor.

14. The apparatus as recited in claim 13, wherein the monitor comprises a temperature sensor and the environmental condition is a predetermined temperature range.

15. The apparatus as recited in claim 13, wherein the monitor comprises a humidity sensor and the environmental condition is a predetermined humidity range.

16. The apparatus as recited in claim 13, wherein the environmental condition is within a predetermined range.

17. The apparatus as recited in claim 13, wherein the environmental condition is outside a predetermined range.

18. The apparatus as recited in claim 13, wherein the monitor comprises a temperature sensor, a humidity sensor and an AND gate that is coupled to the temperature sensor and the humidity sensor and wherein the environmental condition is the presence of a predetermined temperature range and a predetermined humidity range.

19. A method of controlling power supply in an aircraft in-flight entertainment system, comprising:

detecting an on-board environmental condition;

determining if the environmental condition is within a predetermined range independently of the detected environmental condition; and connecting a power supply to the aircraft in-flight entertainment system upon determination of the environmental condition being within said predetermined range, otherwise completely disconnecting the in-flight entertainment system from the power supply without interrupting said detecting.

20. The method as recited in claim 19, wherein in the determining, the predetermined range is a predetermined temperature range.

21. The method as recited in claim 19, wherein in the determining the predetermined range is a predetermined humidity range.

22. The method as recited in claim 19, wherein in the determining, the predetermined range is a predetermined temperature range and a predetermined humidity range.

23. A method of controlling power supply in an in-flight entertainment system, comprising:

providing a first power supply and a second power supply;

detecting an on-board environmental condition using a monitor that receives power from the second power supply independently of the environmental condition detected by said monitor; and connecting the first power supply to a circuit in an in-flight entertainment system upon detection of the environmental condition and completely disconnecting the circuit from the first power supply without interrupting power to the monitor when the environmental condition is no longer detected.

24. The method as recited in claim 23, wherein in the detecting, the monitor comprises a temperature sensor and the environmental condition is a predetermined temperature range.

25. The method as recited in claim 17, wherein in the detecting, the monitor comprises a humidity sensor and the environmental condition is a predetermined humidity range.

26. The method as recited in claim 23, wherein in the detecting, the monitor comprises a temperature sensor, a humidity sensor and an AND gate that is coupled to the temperature sensor and the humidity sensor and wherein the environmental condition is the presence of a predetermined temperature range and a predetermined humidity range.

27. The method as recited in claim 23, wherein in the detecting, the environmental condition is within a predetermined range.

28. The method as recited in claim 23, wherein in the detecting, the environmental condition is outside a predetermined range.

* * * * *